(12) United States Patent
Bush et al.

(10) Patent No.: US 12,073,723 B2
(45) Date of Patent: Aug. 27, 2024

(54) INTELLIGENT PARK ASSIST SYSTEM WITH SIGN INTERPRETATION

(71) Applicant: GM Global Technology Operations LLC, Detroit, MI (US)

(72) Inventors: Lawrence Andrew Bush, Shelby Township, MI (US); Prabhjot Kaur, Auburn Hills, MI (US); Alireza Esna Ashari Esfahani, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 51 days.

(21) Appl. No.: 18/150,507

(22) Filed: Jan. 5, 2023

(65) Prior Publication Data

US 2024/0233537 A1 Jul. 11, 2024

(51) Int. Cl.
| | |
|---|---|
| *G08G 1/14* | (2006.01) |
| *G06V 10/84* | (2022.01) |
| *G06V 20/58* | (2022.01) |
| *H04W 4/44* | (2018.01) |

(52) U.S. Cl.
CPC ............. *G08G 1/143* (2013.01); *G06V 10/85* (2022.01); *G06V 20/582* (2022.01); *G06V 20/586* (2022.01); *H04W 4/44* (2018.02)

(58) Field of Classification Search
CPC ......... G08G 1/143; H04W 4/44; G06V 10/85; G06V 20/582; G06V 20/586
See application file for complete search history.

(56) References Cited

U.S. PATENT DOCUMENTS

| | | | | |
|---|---|---|---|---|
| 2010/0253541 A1* | 10/2010 | Seder | .................. | G08G 1/0962 340/905 |
| 2013/0135118 A1* | 5/2013 | Ricci | ........................ | G07C 5/08 340/932.2 |
| 2021/0383699 A1* | 12/2021 | Xiao | ..................... | B60W 30/06 |

\* cited by examiner

*Primary Examiner* — Joseph H Feild
*Assistant Examiner* — Sharmin Akhter
(74) *Attorney, Agent, or Firm* — Vivacqua Crane, PLLC

(57) ABSTRACT

A method for reducing parking violations includes: receiving, by a controller of a vehicle, sign information of one or more traffic signs in an area surrounding the vehicle, wherein the sign information is a time series of data acquired by a set of cameras as the vehicle moves, using the vehicle as a frame of reference; identifying, by the controller, a potential parking spot in an area surrounding the vehicle; determining, by the controller, using the sign information, whether the potential parking spot is valid or invalid for the vehicle; and generating, by the controller, a notification if the potential parking spot is invalid.

15 Claims, 6 Drawing Sheets

INTELLIGENT PARK ASSIST SYSTEM WITH SIGN INTERPRETATION

INTRODUCTION

The present disclosure relates to vehicle parking and, more particularly, to an intelligent park assist system using interpretation of traffic signs for providing improved parking decisions and reducing parking violations.

SUMMARY

The present disclosure describes a method for providing parking assistance and reducing parking violations by using time series information from existing sensors on a vehicle, such as front and rear cameras, to detect and interpret traffic signs to determine whether potential parking spots are valid or invalid. The vehicle may be equipped with an Advanced Park Assist (APA) system or other system capable of assisting a vehicle operator in parking the vehicle. In certain vehicles, the APA autonomously (or semi-autonomously) guides the vehicle to a valid empty parking spot and autonomously (or semi-autonomously) parks the vehicle. When the vehicle is equipped with an APA system or any other system capable of assisting a vehicle operator in parking the vehicle, the surrounding information relevant to parking restrictions, such as traffic signs, fire hydrants, etc. that are detected using on-board sensors (e.g., cameras, radar, LiDAR) and/or infrastructure-to-vehicle (I2V) wireless communications) may be fed into the APA system. When the vehicle is not equipped with an APA system, the sign information may be used along with other information to determine whether a parking spot is valid or invalid, and issue a warning to the vehicle operator via the Driver Information Center (DIC) when a parking spot is invalid. The method may also initiate a parking payment transaction through the navigation display or smart phone.

The present disclosure describes a method for providing parking assistance and reducing parking violations. In an aspect of the present disclosure, the method includes receiving, by a controller of a vehicle, sign information of one or more traffic signs in an area surrounding the vehicle, wherein the sign information is a time series of data acquired by a set of cameras as the vehicle moves, using the vehicle as a frame of reference; identifying, by the controller, a potential parking spot in an area surrounding the vehicle; determining, by the controller, using the sign information, whether the potential parking spot is valid or invalid for the vehicle; and generating, by the controller, a notification if the potential parking spot is invalid.

In an aspect of the present disclosure, corresponding sign image data of each of the one or more traffic signs is acquired by the set of cameras, wherein the set of cameras is on the vehicle or in the area of the vehicle, and wherein the sign image data is analyzed by the controller to generate the sign information.

In an aspect of the present disclosure, determining whether the potential parking spot is valid or invalid for the vehicle comprises determining, for each of the one or more traffic signs, whether the traffic sign is relevant to the potential parking spot using a hidden Markov model and, for each traffic sign that is relevant to the potential parking spot, analyzing parking restriction parameters of the traffic sign.

In an aspect of the present disclosure, the method further includes querying a vehicle operator and receiving information from the vehicle operator to analyze parking restriction parameters of the traffic sign.

In an aspect of the present disclosure, wherein determining, for each of the one or more traffic signs whether the traffic sign is relevant to the potential parking spot using a hidden Markov model includes: determining, for each time step of a plurality of time steps, whether the traffic sign is detected at each of a plurality of directional bins with respect to the vehicle; classifying each detected sign with a corresponding sign indicator; clustering, for each time step, corresponding sign indicators in appropriate directional bins; determining a corresponding histogram over the plurality of time steps of traffic sign detections for each directional bin of the plurality of bins; and predicting traffic sign detections at each directional bin using the histograms and a calculated vehicle movement to determine whether the traffic sign is relevant using the hidden Markov model.

In an aspect of the present disclosure, identifying a potential parking spot in an area surrounding the vehicle comprises determining an intent of a vehicle operator to park in the potential parking spot using operator behavior data acquired via one or more sensors of the vehicle as the vehicle moves, wherein the one or more sensors of the vehicle include a camera, a radar device, a ground penetrating radar (GPR) device, a lidar device, or a GPS device.

In an aspect of the present disclosure, determining the intent of the vehicle operator to park in the potential parking spot uses a velocity based second hidden Markov model (HMM) using a speed and a direction of the vehicle.

In an aspect of the present disclosure, wherein generating a notification if the potential parking spot is invalid comprises providing an alert to the vehicle operator, wherein the alert is a visual alert, an audio alert, or a haptic alert.

In an aspect of the present disclosure, identifying a potential parking spot in an area surrounding the vehicle comprises searching for the potential parking spot using an advanced park assist system.

In an aspect of the present disclosure, the method further includes: determining that the vehicle is equipped with an advanced park assist system; and in response to determining that the vehicle is equipped with an advanced park assist system and determining that the potential parking spot is invalid, searching for another potential parking spot using the advanced park assist system.

In an aspect of the present disclosure, parking restriction data is received from an infrastructure-to-vehicle (I2V) message transmitted by an infrastructure device and the parking restriction data is used to determine whether the potential parking spot is valid, invalid, or remains valid.

In an aspect of the present disclosure, the method further includes guiding, in response to determining that the potential parking spot is valid, using an advanced park assist system, the vehicle to park in the valid parking spot.

In an aspect of the present disclosure, the method further includes initiating a parking payment of a parking meter after the vehicle is parked in the valid parking spot; and monitoring a timer of the parking meter.

In an aspect of the present disclosure, a method for reducing parking violations includes receiving, by a controller of a vehicle, sign information of one or more detected traffic signs in the area surrounding the vehicle, wherein the sign information is a time series of data acquired by a set of cameras on the vehicle, using the vehicle as a frame of reference and receiving, by the controller, vehicle movement information. The method includes determining, by the controller, using a first hidden Markov model and the sign information, whether a traffic sign is relevant for a given location, and determining, using a second hidden Markov model and the vehicle movement information, an intended parking spot of the vehicle; determining, by the controller, using outputs of the first and the second hidden Markov models, whether the intended parking spot of the vehicle is valid or invalid for the vehicle; and generating, by the controller, an alert if the intended parking spot is invalid.

The present disclosure also relates to a vehicle system. In an aspect of the present disclosure, the vehicle system includes a controller, a set of cameras in communication with the controller; and a user interface in communication with the controller. The controller is programmed to: receive sign information of one or more traffic signs in an area surrounding the vehicle from the set of cameras, wherein the sign information is a time series of data acquired as the vehicle moves, using the vehicle as a frame of reference; identify a potential parking spot in an area surrounding the vehicle; determine, using the sign information, whether the potential parking spot is valid or invalid for the vehicle; and generate an alert if the potential parking spot is invalid via the user interface.

In an aspect of the present disclosure, the controller is further programmed to: determine, for each of the one or more traffic signs, whether the traffic sign is relevant to the potential parking spot using a hidden Markov model, and analyze, for each of the one or more traffic signs if the traffic sign is relevant to the potential parking spot, parking restriction parameters of the traffic sign.

In an aspect of the present disclosure. wherein to determine, for each time step of a plurality of time steps, whether a traffic sign is relevant to the potential parking spot using a hidden Markov model, the controller is programmed to determine, for each time step of a plurality of time steps, whether the traffic sign is detected at each of a plurality of directional bins with respect to the vehicle; classify each detected traffic sign with a corresponding sign indicator; cluster, for each time step of the plurality of time steps, corresponding sign indicators in appropriate directional bins relative to the vehicle; determine a corresponding histogram over the plurality of time steps of traffic sign detections for each directional bin of the plurality of bins; and predict traffic sign detections at each directional bin using the histograms and a calculated vehicle movement to determine whether the traffic sign is relevant using the hidden Markov model.

In an aspect of the present disclosure, the system further includes vehicle sensors in communication with the controller, wherein the vehicle sensors include a radar device, a ground penetrating radar (GPR) device, a lidar device, or a GPS device. To identify a potential parking spot that is open in an area surrounding the vehicle, the controller is further programmed to determine an intent of an operator of the vehicle to park in the potential parking spot using operator behavior data acquired via the vehicle sensors as the vehicle is moving and a velocity based second hidden Markov model.

In an aspect of the present disclosure the controller is further programmed to guide the vehicle in response to a determination that the potential parking spot is valid, to park in the valid parking spot.

In an aspect of the present disclosure, the controller is further programmed to initiate a parking payment of a parking meter after the vehicle is parked in the valid parking spot and to monitor a timer of the parking meter.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following description is merely exemplary in nature and is not intended to limit the present disclosure, application, or uses.

Figure 1:
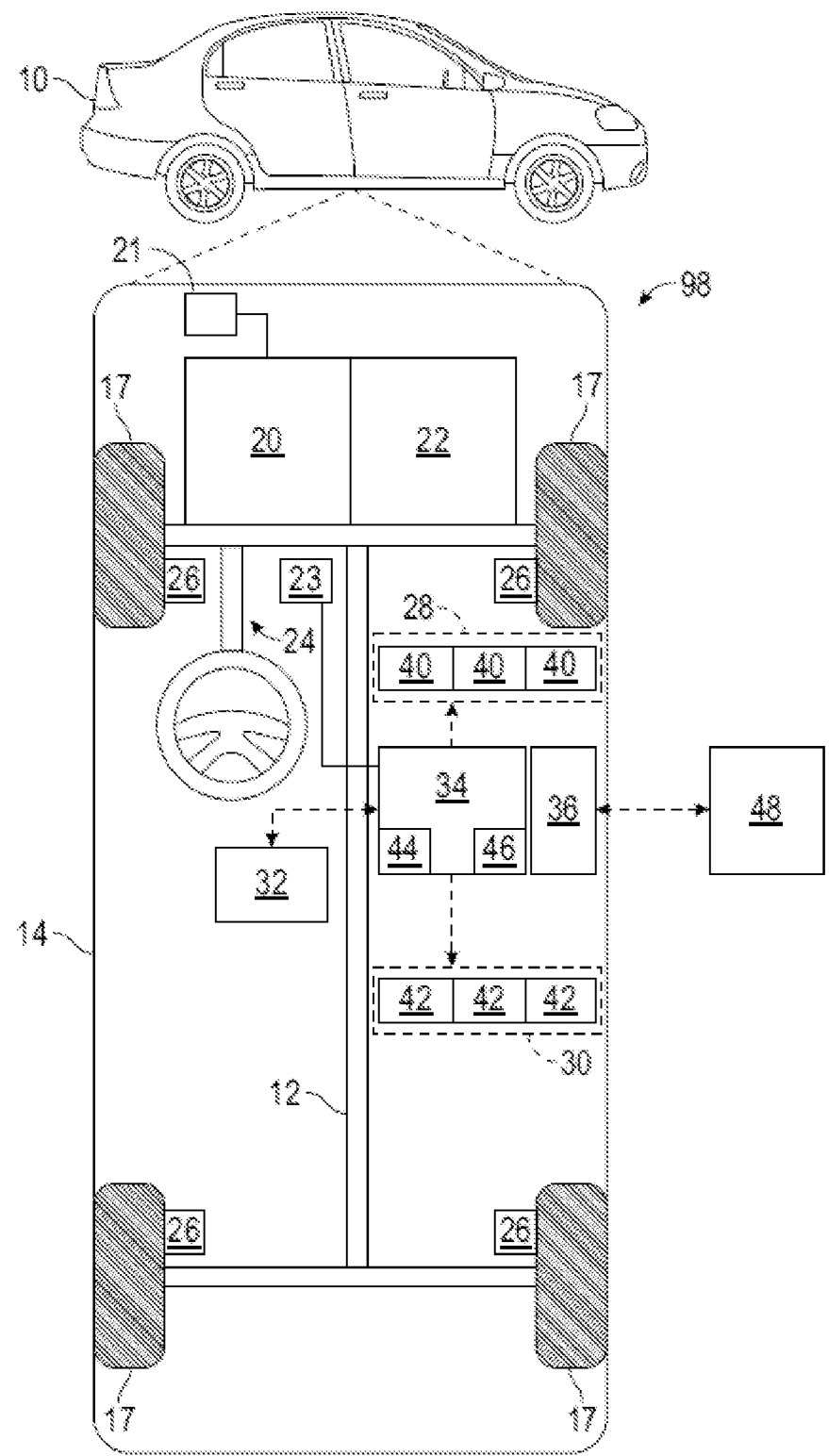
FIG. 1 is a schematic block diagram of a vehicle.

As depicted in FIG. 1, a vehicle 10 generally includes a chassis 12, a body 14, and front and rear wheels 17 and which may be referred to as a host vehicle or a vehicle system. The body 14 is arranged on the chassis 12 and typically substantially encloses components of the vehicle 10. The body 14 and the chassis 12 may jointly form a frame. The wheels 17 are each rotationally coupled to the chassis 12 near a respective corner of the body 14.

In various examples, the vehicle 10 maybe an autonomous vehicle and a control system 98 is incorporated into the vehicle 10. The control system 98 maybe simply referred to as the system herein. The vehicle 10 is, for example, a vehicle that is automatically controlled to carry passengers from one location to another. The vehicle 10 is depicted in the illustrated embodiment as a passenger car, but it should be appreciated that other vehicles including motorcycles, trucks, sport utility vehicles (SUVs), recreational vehicles (RVs), marine vessels, aircraft, etc., are also contemplated. In an example, the vehicle 10 may include a so-called Level Four or Level Five automation system. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of dynamic driving tasks under a number of roadway and environmental conditions which can be managed by a human driver. In some cases, the vehicle system 98 includes an advanced park assist system.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some examples, the steering system 24 may not include a steering wheel.

The sensor system 28 includes one or more sensors 40 (i.e., sensing devices) that sense conditions of the exterior environment and/or the interior environment of the vehicle 10. The sensors 40 are in communication with the controller 34 and may include, but are not limited to, one or more cameras (e.g., optical cameras and/or thermal cameras, such as one or more rear cameras and/or one or more front cameras), a speed sensor, one or more radar devices, one or more light detection and ranging (lidar) sensors, one or more ground penetrating radar (GPR) sensors, one or more global positioning system (GPS) devices, a steering angle sensor, ultrasonic sensors, one or more inertial measurement units (IMUs) and/or other sensors. Each sensor 40 is configured to detect one or more parameters, such as those related to sign information, parking restriction information, velocity, or other data regarding the vehicle or the environment in the area surrounding the vehicle 10. For example, one or more sensors 40 may include a set of cameras that may detect peak period signs, no stopping/no standing signs, street cleaning signs, no stop at specific time sign, one or more fire hydrants, no stop/bus zone signs, one or more fire lanes, one or more handicap zones, no parking—sidewalk sign, boot citation area, one or more preferential parking signs, one or more permit parking signs, one or more other parking restriction signs, one or more parking restriction lines or markings near a vehicle, and the like.

The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The sensor system 28 includes one or more Global Positioning System (GPS) devices configured to detect and monitor vehicle position related to route data (i.e., route information). The GPS device is configured to communicate with a GPS satellite to locate the position of the vehicle 10, such as with respect to a map of the area. The GPS device is in electronic communication with the controller 34. Because the sensor system 28 provides data to the controller 34, the sensor system 28 and its sensors 40 are sources of information (or simply sources).

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by a remote system and communicated to the vehicle 10 (wirelessly and/or in a wired manner) and stored in the data storage device 32. The data storage device 32 maybe part of the controller 34, separate from the controller 34, or part of the controller 34 and part of a separate system.

The controller 34 includes at least one processor 44 and a non-transitory computer readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 maybe implemented using a number of known memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing various logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control components of the vehicle 10 based on the logic, calculations, methods, and/or algorithms. Although a single controller 34 is shown in FIG. 1, embodiments of the vehicle 10 may include multiple controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a user interface 23, which may be a display screen in the dashboard and including touchscreen capability for user input. The user interface 23 may include a device to generate an alert or alarm, such as a speaker to provide a sound, a haptic feedback in a vehicle seat or other object, a visual display, or other device suitable to provide a notification or alert to the vehicle operator of the vehicle 10. The user interface 23 is in electronic communication with the controller 34 and is configured to receive inputs by a user (e.g., vehicle operator or passenger). Accordingly, the controller 34 is configured to receive inputs from the user via the user interface 23, such as to provide information from the user to the controller 34. The controller may generate queries for a user to be displayed or generate sound via the user interface 23. The user interface 23 includes a display configured to display information to the user (e.g., vehicle operator or passenger) and may include one or more speakers to provide an audible notification to the vehicle operator. The user interface 23 maybe a driver information center (DIC) capable of providing information to the vehicle operator of the vehicle 10.

The communication system 36 is in communication with the controller 34 and is configured to wirelessly communicate information to and from other entities 48, such as but not limited to, other vehicles ("V2V" communication), infrastructure devices ("I2V" or "V2I" communication), remote systems, and/or personal devices. In an example, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs). The communication system 36 is configured to wirelessly communicate information between the vehicle 10 and another vehicle. Further, the communication system 36 is configured to wirelessly communication information between the vehicle 10 and infrastructure devices, such as a parking meter. Accordingly, the vehicle 10 may use I2V communications to receive parking restriction information or data from an infrastructure device, such as a parking meter.

Figure 2:
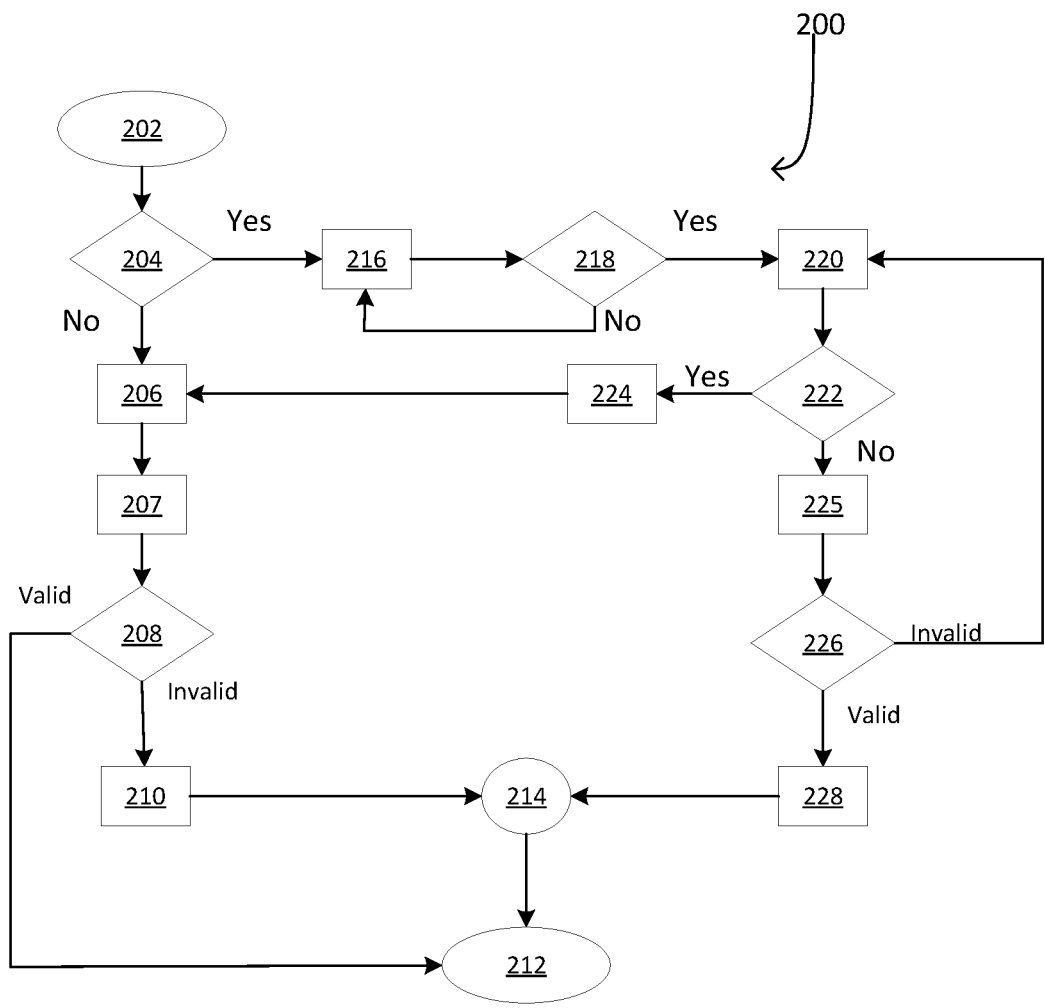
FIG. 2 is a flowchart of a method for providing parking assistance and reducing parking violations for a vehicle.

FIG. 2 is a flowchart for a method 200 for providing parking assistance for a vehicle and reducing parking violations, which may be executed by the controller 34. The method 200 begins at block 202. Then, the method 200 proceeds to block 204.

At block 204, the controller 34 determines whether the vehicle 10 is equipped with an advanced park assist (APA) system. If the vehicle 10 is not equipped with an APA system, then the method 200 proceeds to block 206.

At block 206, the controller 34 determines whether manual parking has been initiated, i.e., whether a vehicle operator of vehicle 10 is searching for an empty parking spot in the area surrounding the vehicle. To do so, the controller 34 may receive inputs from the sensors 40, such as the speed sensors, steering angle sensors, among others. The controller 34 then determines whether the manual parking has been initiated using the inputs from the sensors 40. The method then proceeds to block 207.

Based on the vehicle operator behavior (and vehicle movement), the controller 34 at block 207 identifies a parking spot using the inputs from the sensors 40, such as by determining an intended parking spot in which the vehicle operator intends to park. This may be achieved by using a velocity-based second hidden Markov model to infer where the vehicle operator intends to park, such as further described with respect to FIG. 4. At block 207, the vehicle operator of the vehicle 10 has attempted to park in an open parking spot but the vehicle operator does not necessarily know whether that parking spot is valid or invalid. The method 200 then proceeds to block 208, wherein the controller determines whether a potential parking spot is valid or invalid.

At block 208, the controller 34 receives sign information corresponding to one or more traffic signs in an area surrounding the vehicle from a set of cameras, wherein the sign information is a time series of data acquired as the vehicle is moving, using the vehicle as a frame of reference. The times series of images may be acquired with a set of cameras that essentially may provide a 360 degree view around the vehicle. The controller may analyze the images in order to detect the presence of signs and to extract sign parking restriction information (or parking restriction data) in the area surrounding the vehicle 10 and the identified intended parking spot. Parking restriction data may also be provided from other sensors 40 and/or I2V (infrastructure to vehicle) communications from an infrastructure device, such as a parking meter in a parking lot. As mentioned above, the sensor 40 may include one or more cameras (front and/or rear cameras), one or more radars, one or more lidars, one or more ultrasonic sensors, one or more GPS devices, among others. Using the sign information (such as sign image data from cameras), the controller 34 determines whether a traffic sign is relevant to an identified potential parking spot, such as the intended parking spot, and analyzes any parking restriction parameters related to the traffic sign or other parking restriction data to determine whether a potential parking spot is valid or invalid. A parking spot is invalid if it violates a condition or restriction on a relevant sign or another parking restriction that is determined to be relevant. Block 208 may entail execution of a first hidden Markov model to determine whether a traffic sign is relevant to a particular location as the vehicle is moving, as described below with respect to FIG. 3A. Block 208 then combines the parking restriction belief state for a location with the intended parking spot. If the identified intended parking spot is determined to be invalid, then the method 200 proceeds to block 210. Otherwise, if the identified intended parking spot is determined to be valid, the method 200 proceeds to block 212. At block 212, the method 200 ends.

At block 210, the controller 34 commands the user interface 23 to provide a notification in the form of an alert (e.g., alarm or warning) to the vehicle operator of the vehicle 10, indicating that the identified empty parking spot is invalid. As discussed above, this alert may be in the form of an audible sound, a haptic feedback in a vehicle seat or other object, information displayed in a visual display, or other notification or warning to the vehicle operator of the vehicle 10. The alert may also include a notification to the cell phone of the vehicle operator of the vehicle 10. After block 210, the method 200 proceeds to block 214, which is a payment process and is described in detail below with respect to FIG. 5.

Returning to block 204, if the vehicle 10 is equipped with the APA system, then the method 200 proceeds to block 216. At block 216, the APA system is in the standby phase or mode. Then, the method 200 proceeds to block 218.

At block 218, the APA system is initiated. To do so, the vehicle operator of the vehicle 10 may, for example, push a button on the user interface 23 to initiate the APA system. The APA system, however, may be initiated other ways, such as by vocal command or the like. If the APA system is not initiated, the method 200 returns to block 216. However, if the APA system is initiated, then the method 200 proceeds to block 220.

At block 220, the APA system, using the controller 34, enters the search phase. In the search phase, the APA system searches for one or more empty potential parking spots in the area surrounding the vehicle 10. To do so, the APA system may use the sensors 40 of the vehicle 10, such as cameras and/or ultrasonic sensors, GPS information, and maps of the area. Then, the method 200 proceeds to block 222.

At block 222, the controller 34 detects whether there is a manual override. The manual override may be an input from the vehicle operator through the user interface 23. If a manual override is detected, then the method 200 proceeds to block 224.

At block 224, the APA system and associated maneuvers is aborted. Then, the method 200 proceeds to block 206.

If the manual override is not detected at block 222, then the method 200 proceeds to block 225. At block 225, the controller identifies one or more current potential parking spots for the vehicle based on the APA generated potential parking spots. Then the method 200 proceeds to block 226.

At block 226, the controller 34 receives sign image information corresponding to one or more traffic signs in an area surrounding the vehicle from a set of cameras, wherein the sign image information is a time series of data acquired with a set of cameras as the vehicle is moving, using the vehicle as a frame of reference. The controller is programmed to analyze the sign image information (e.g. analyze the acquired images) in order to detect the presence of traffic signs relative to the vehicle at different points in time in the area surrounding the vehicle 10 as it is moving and thus in the area surrounding the identified potential parking spot and to extract sign parking restriction data corresponding to detected signs. Parking restriction information may also be provided from other sensors 40 and/or I2V (infrastructure to vehicle) communications from an infrastructure device, such as a parking meter in a parking lot. Using this sign information, the controller 34 determines whether a traffic sign is relevant to an identified potential parking spot and analyzes any parking restriction data related to the traffic sign or other sensors to determine whether a potential parking spot is valid or invalid. A parking spot is invalid if it violates a condition or restriction on a relevant sign or other parking restriction from another source. Block 226 may include execution of a first hidden Markov model as described with respect to FIG. 3A using the sign information to determine relevancy of a traffic sign as the vehicle is moving. If the identified potential parking spot is determined to be invalid, then the method 200 returns to block 220 and another potential parking spot is determined. Otherwise, if the identified parking spot is valid, the method 200 proceeds to block 228.

At block 228, the APA system enters the guidance phase. In the guidance phase, the APA system automatically guides the vehicle 10 to the valid parking spot. After block 228, then method 200 proceeds to block 214, which is a parking payment process. After block 214, the method 200 ends at block 212.

Figure 3A:
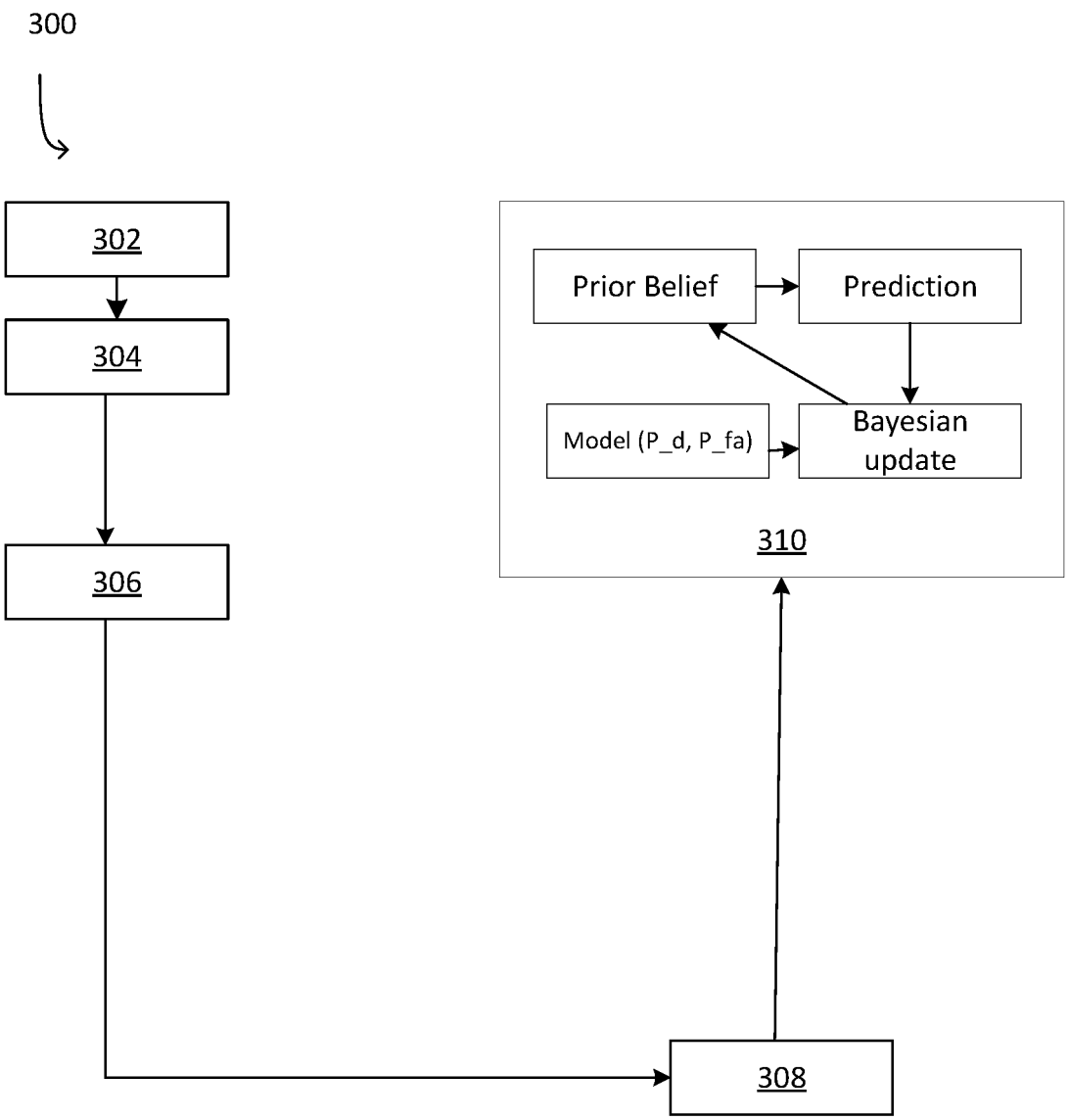
FIG. 3A is a flowchart of a method for using a first hidden Markov model to determine whether a potential parking spot is valid or invalid and which is part of the method of FIG. 2.

FIG. 3A is a flowchart of a process for predicting whether a traffic sign is relevant to the vehicle as the vehicle is moving. Process 300 is executed by the controller and includes a first hidden Markov model (HMM) that uses the sign information to determine parameters $P\_d$ (probability of detection of a particular sign at various directional bins and distances from the vehicle), and $P\_fa$, (probability of a false alarm) and evolve beliefs regarding the relevancy of a detected sign as the vehicle is moving.

At block 302, the controller receives sign information of one or more traffic signs in an area surrounding the vehicle, wherein the sign information is a time series of data (having time steps) that is acquired by a set of cameras as the vehicle is moving, using the vehicle as a frame of reference. The sign information is analyzed to detect the presence of signs and interpret the signs. Then processing proceeds to block 304.

Figure 3B:
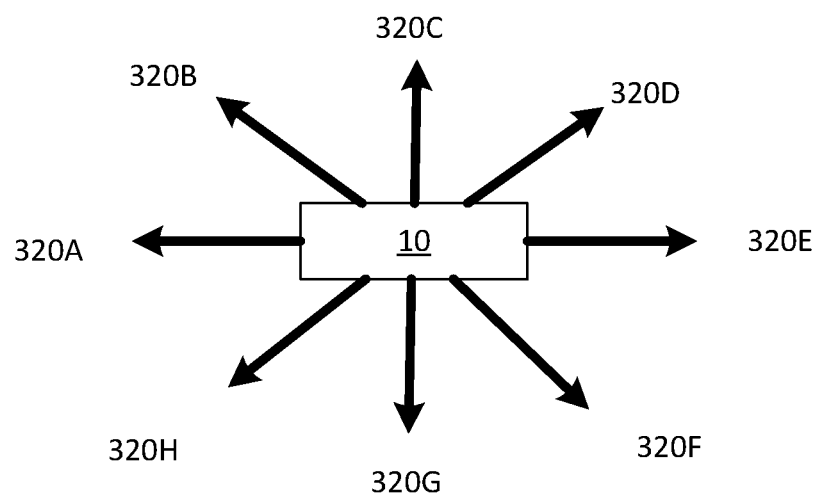
FIG. 3B illustrates the concept of directional bins with respect to a vehicle.

At block 304, for each time step and directional bin 320A-H defined with respect to the vehicle 10 (shown in FIG. 3B), corresponding sign interpretation information is analyzed to determine whether detected traffic signs are relevant to parking, and to determine any parking restriction parameters of detected traffic signs. At each time step, for each detected traffic sign, the controller determines whether the sign is detected at each of the directional bins.

The detected traffic signs may be classified by sign type or category and each assigned a corresponding sign indicator to reflect its classification. Parking restriction parameters may include constraints, such as time constraints on parking (e.g. no parking 9 AM-12 PM, no overnight parking, etc.), type of vehicle restraints (e.g., electric vehicles only, no RVs, etc.), vehicle occupant constraints (e.g., handicap parking, employee parking only, visitors only, customer only parking, physician parking, church parking, permit only parking, etc.), and other constraints or restrictions (no parking in fire lane or loading zone, do not block gate, and the like). The controller may have access to external information to evaluate the constraints. For example, the controller may know information regarding the current time, characteristics of a vehicle operator/occupant, and other information, and the controller is also able to query a vehicle operator to obtain information to evaluate the constraints.

At block 306, for each time step, the controller clusters the sign indicators in the various directional bins (e.g., eight different directional bins 320A, 320B, 320C, 320D, 320E, 320F, 320G, 320H) with respect to the vehicle 10, such as based on proximity to the vehicle, azimuth angle bin centers, and/or distance away clustering, or the like.

At block 308, a histogram for each directional bin timestep is generated, along with a multinomial of detections for each directional bin over the plurality of time steps.

At block 310, a first hidden Markov model is used for each sign class (or sign indicator), wherein Model ($P\_d$ and $P\_fa$) is determined for each new sign detection and is smoothed over time using a Bayesian update for each classification, generating a belief. A belief prediction step uses a prior belief and velocity information for the vehicle, such that a bin belief state probabilistically moves to a next or previous angular directional bin, conditioned on a direction and speed of travel of the vehicle. A transition matrix can be used to move a belief from bin to bin, such as from bin 320 A to bin 320B if vehicle 10 is moving from right to left in FIG. 3B. In this manner, the first hidden Markov model determines whether a vehicle location has relevant traffic sign information associated with it, from one or more applicable traffic signs. Knowing an identified intended parking spot allows for combining this information such that the controller can determine whether a relevant traffic sign is associated with the intended parking spot and to evaluate the parking restrictions associated with the traffic sign.

Figure 4:
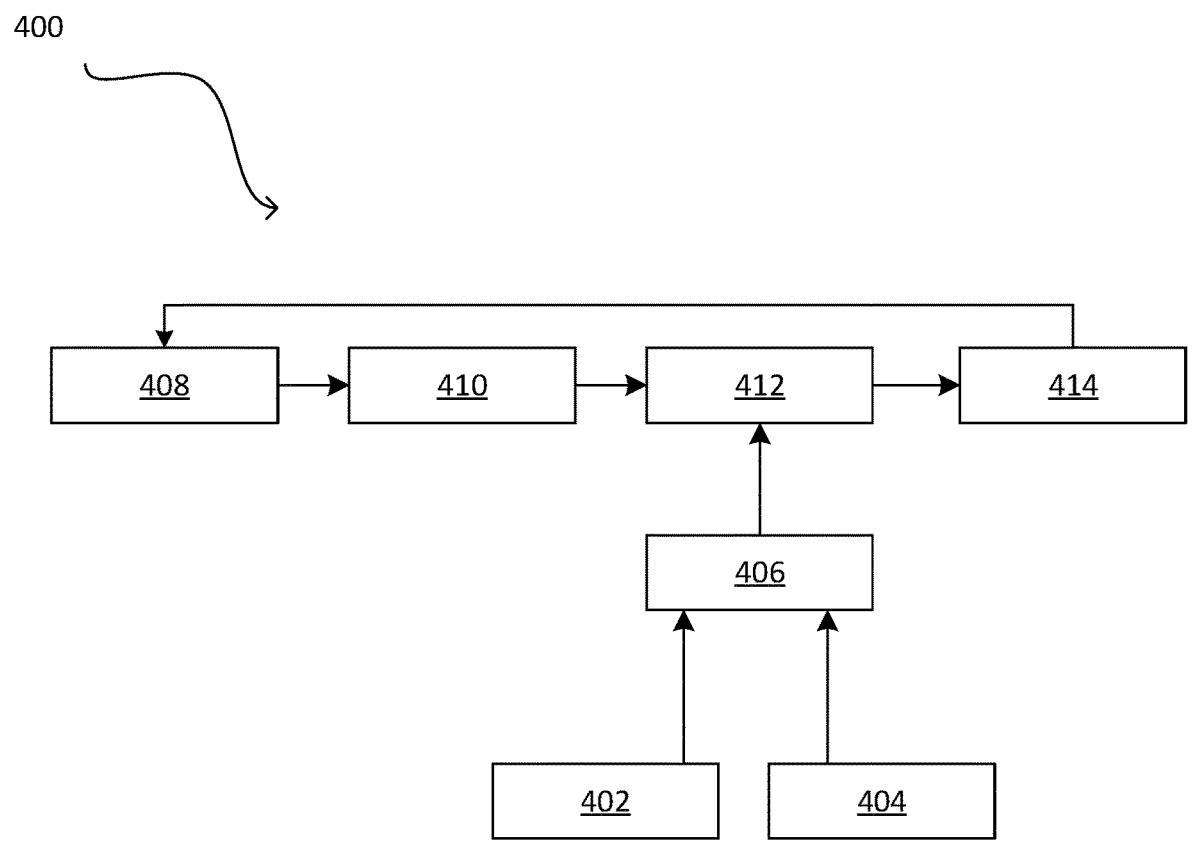
FIG. 4 is a flowchart of a method using a second hidden Markov model to determine an intended parking spot of a vehicle operator and which is part of the method of FIG. 2.

FIG. 4 is a flowchart of a process 400 for predicting where a vehicle will park (i.e., the intended parking spot) based on the behavior of a vehicle operator. Process 400 is performed by the controller and may include a second hidden Markov model. Here the second hidden Markov model uses time series data, such as velocity information of the vehicle as the vehicle is moving to predict where the vehicle will be parked, using directional bins such as bins 320A-H around the vehicle 10 as shown with respect to FIG. 3B. Velocity information may be acquired by one or more sensors 40 to provide a speed and direction of vehicle travel. The second hidden Markov model may be used to generate a probability distribution over a sequence of observations regarding an intention of an operator to park in a potential parking spot.

At block 408, an initial prior belief is determined. An initial prior belief that the vehicle plans to park in a directional bin is initialized uniformly at block 408 using a set of directional bins around the vehicle. Processing then proceeds to block 410. Subsequently, a prior belief that the vehicle plans to park in a directional bin is determined using a posterior belief from block 414 in a feedback loop and processing proceeds to block 410.

At block 410, a prior belief is updated based on a current vehicle location using a Bayesian update.

At blocks 402 and 404, the controller 34 receives inputs from respective sensors 40 of a vehicle speed and a vehicle direction, at each of a series of time steps as the vehicle moves. As discussed above, the sensors 40 may include, for example, cameras, radars, lidar, GPR sensors, ultrasound sensors, GPS devices, among others. The process then proceeds to block 406. At block 406, a process matrix is generated or updated to define a diffusion process to be used in a prediction model of block 412, and the process proceeds to block 412.

At block 412, a prediction model is used to evolve a prior belief of parking location using the process matrix and the prior belief received from block 410. Then processing proceeds to block 414. At block 414, a posterior belief in the form of a multinomial distribution is determined, which is used in a feedback loop to update a prior belief for block 408. If all the data is processed at block 414, then the vehicle is assumed to intend to park in the bin with the highest probability.

Figure 5:
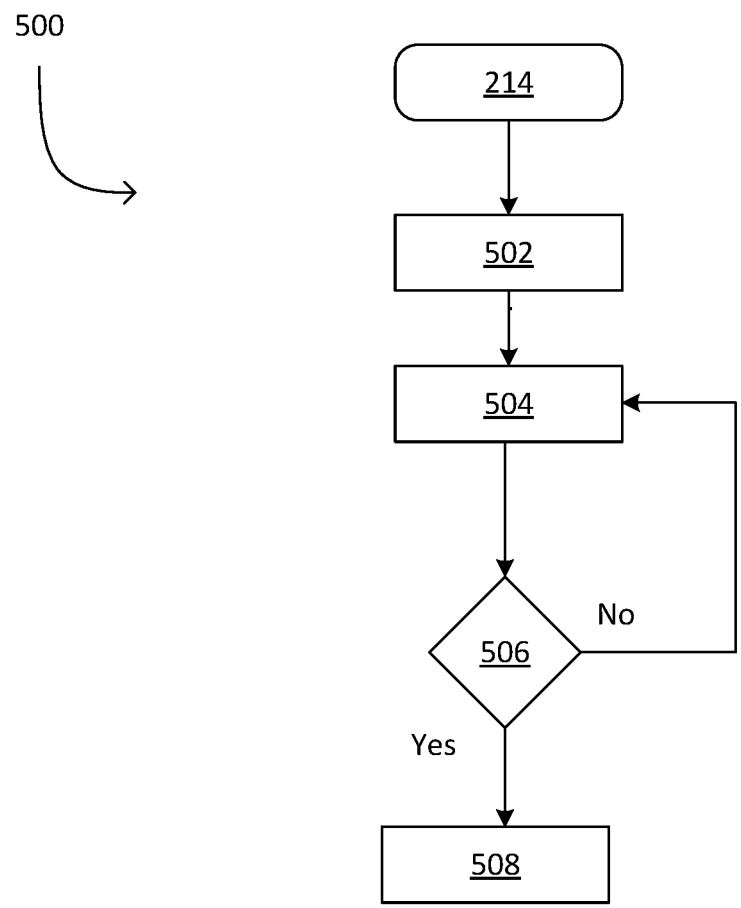
FIG. 5 is a flowchart of a payment process.

FIG. 5 is a flowchart of a parking payment process 500, which begins at block 214. Then, the parking payment process 500 continuous to block 502. At block 502, the vehicle operator pays for parking (if necessary) once the vehicle 10 is parked. To do so, the vehicle operator of the vehicle 10 may manually pay for the parking by interacting with a parking meter with cash, credit cards, debits cards, among others. Alternatively, the vehicle operator may pay with an app on his or her phone. Also, the vehicle operator may pay for the parking spot using the user interface 23 and sending a V2I communication. Further, the parking payment may occur automatically in response to the V2I communication received by the controller 34 of the vehicle. The vehicle operator may pay to park at this parking spot for a set amount of time (i.e., the paid amount of time). Once the parking payment is made, the parking payment process 500 proceeds to block 504

At block 504, the parking meter timer starts. Then, the parking payment process 500 proceeds to block 506 to determine the amount of time that has lapsed since the vehicle operator paid for the parking. Then, the parking payment process 500 proceeds to block 506.

At block 506, the controller 34 of the vehicle 10 and/or the cell phone of the vehicle user receives a message from the parking meter, via for example V2I communications, about whether the park meter timer has expired. The park meter timer expires when the vehicle 10 has parked in the parking spot for the paid amount of time. If the park meter timer has not expired, then the parking payment process 500 returns to block 504. If the park meter timer has expired, then the parking payment process 500 continues to block 508.

At block 508, the controller 34 provides a notification to the vehicle operator that the timer of the parking meter has expired. To do so, the notification may be sent to the cell phone of the vehicle operator if the cell phone is linked to the vehicle 10. Also, at block 508, the payment may occur automatically if the time left on the park meter timer is less than a predetermined amount of time to avoid a parking violation.

The detailed description is merely exemplary in nature and is not intended to limit the application and uses. Furthermore, there is no intention to be bound by expressed or implied theory presented in the brief summary or the detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for providing parking assistance, comprising:
   receiving, by a controller of a vehicle, sign information of one or more traffic signs in an area surrounding the vehicle, wherein the sign information is a time series of data acquired by a set of cameras as the vehicle moves, using the vehicle as a frame of reference;
   identifying, by the controller, a potential parking spot in an area surrounding the vehicle;
   determining, by the controller, using the sign information, whether the potential parking spot is valid or invalid for the vehicle by determining, for each of the one or more traffic signs, whether the traffic sign is relevant to the potential parking spot using a hidden Markov model and, for each traffic sign that is relevant to the potential parking spot, analyzing parking restriction parameters of the traffic sign by:
   determining, for each time step of a plurality of time steps, whether the traffic sign is detected at each of a plurality of directional bins with respect to the vehicle;
   classifying a detected traffic sign with a corresponding sign indicator;

clustering, for each time step of the plurality of time steps, corresponding sign indicators in appropriate directional bins;

determining a corresponding histogram over the plurality of time steps of traffic sign detections for each directional bin of the plurality of bins; and predicting traffic sign detections at each directional bin using the histograms and a calculated vehicle movement to determine whether the traffic sign is relevant using the hidden Markov model; and generating, by the controller, a notification that the potential parking spot is invalid.

2. The method of claim 1, wherein corresponding sign image data of each of the one or more traffic signs is acquired by the set of cameras, wherein the set of cameras is on the vehicle or in the area of the vehicle, and wherein the sign image data is analyzed by the controller to generate the sign information.

3. The method of claim 1, further comprising querying a vehicle operator and receiving information from the vehicle operator to analyze parking restriction parameters of the traffic sign.

4. The method of claim 1, wherein identifying a potential parking spot in an area surrounding the vehicle comprises determining an intent of a vehicle operator to park in the potential parking spot using operator behavior data acquired via one or more sensors of the vehicle as the vehicle moves, wherein the one or more sensors of the vehicle include a camera, a radar device, a ground penetrating radar (GPR) device, a lidar device, or a GPS device.

5. The method of claim 4, wherein determining the intent of the vehicle operator to park in the potential parking spot uses a velocity based hidden Markov model (HMM) using a speed and a direction of the vehicle.

6. The method of claim 5, wherein generating a notification if the potential parking spot is invalid comprises providing an alert to the vehicle operator, wherein the alert is a visual alert, an audio alert, or a haptic alert.

7. The method of claim 1, wherein identifying a potential parking spot in an area surrounding the vehicle comprises searching for the potential parking spot using an advanced park assist system.

8. The method of claim 1, further comprising:
determining that the vehicle is equipped with an advanced park assist system; and
in response to determining that the vehicle is equipped with an advanced park assist system and determining that the potential parking spot is invalid, searching for another potential parking spot using the advanced park assist system.

9. The method of claim 1, wherein parking restriction data is received from an infrastructure-to-vehicle (I2V) message transmitted by an infrastructure device and the parking restriction data is used to determine whether the potential parking spot is valid, invalid, or remains valid.

10. The method of claim 1, further comprising:
guiding, in response to determining that the potential parking spot is valid, using an advanced park assist system, the vehicle to park in the valid parking spot.

11. The method of claim 9, further comprising:
initiating a parking payment of a parking meter after the vehicle is parked in the valid parking spot; and
monitoring a timer of the parking meter.

12. A system for parking assistance of a vehicle, comprising:
a controller;
a set of cameras in communication with the controller; and
a user interface in communication with the controller,
wherein the controller is programmed to:
receive sign information of one or more traffic signs in an area surrounding the vehicle from the set of cameras, wherein the sign information is a time series of data acquired as the vehicle moves, using the vehicle as a frame of reference;
identify a potential parking spot in an area surrounding the vehicle;
determine, using the sign information, whether the potential parking spot is valid or invalid for the vehicle by determining, for each of the one or more traffic signs, whether the traffic sign is relevant to the potential parking spot using a hidden Markov model and analyzing, for each traffic sign that is relevant to the potential parking spot, parking restriction parameters of the traffic sign by:
determining, for each time step of a plurality of time steps, whether the traffic sign is detected at each of a plurality of directional bins with respect to the vehicle;
classifying a detected traffic sign with a corresponding sign indicator;
clustering, for each time step of the plurality of time steps, corresponding sign indicators in appropriate directional bins;
determining a corresponding histogram over the plurality of time steps of traffic sign detections for each directional bin of the plurality of bins; and
predicting traffic sign detections at each directional bin using the histograms and a calculated vehicle movement to determine whether the traffic sign is relevant using the hidden Markov model; and
generate an alert if the potential parking spot is invalid via the user interface.

13. The system of claim 12, further comprising:
vehicle sensors in communication with the controller, wherein the vehicle sensors include a radar device, a ground penetrating radar (GPR) device, a lidar device, or a GPS device, and
wherein to identify a potential parking spot that is open in an area surrounding the vehicle, the controller is further programmed to:
determine an intent of an operator of the vehicle to park in the potential parking spot using operator behavior data acquired via the vehicle sensors as the vehicle is moving and a velocity based hidden Markov model.

14. The system of claim 12, wherein the controller is further programmed to:
guide the vehicle in response to a determination that the potential parking spot is valid, to park in the valid parking spot.

15. The system of claim 12, wherein the controller is further programmed to:
initiate a parking payment of a parking meter after the vehicle is parked in the valid parking spot and to monitor a timer of the parking meter.

* * * * *